(12) United States Patent
Haba et al.

(10) Patent No.: US 9,096,742 B2
(45) Date of Patent: Aug. 4, 2015

(54) PNEUMATIC TIRE

(71) Applicant: SUMITOMO RUBBER INDUSTRIES, LTD., Kobe-shi, Hyogo (JP)

(72) Inventors: Toshifumi Haba, Kobe (JP); Tatsuya Miyazaki, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 0 days.

(21) Appl. No.: 14/566,049

(22) Filed: Dec. 10, 2014

(65) Prior Publication Data

US 2015/0191586 A1 Jul. 9, 2015

(30) Foreign Application Priority Data

Jan. 8, 2014 (JP) .................. 2014-001830

(51) Int. Cl.
*C08L 7/00* (2006.01)
*C08L 9/06* (2006.01)
*C08L 9/00* (2006.01)

(52) U.S. Cl.
CPC .............. *C08L 9/00* (2013.01); *C08L 2205/025* (2013.01); *C08L 2205/035* (2013.01)

(58) Field of Classification Search
USPC ................. 523/156, 438; 524/526; 152/209.1
See application file for complete search history.

(56) References Cited

U.S. PATENT DOCUMENTS

2014/0275331 A1* 9/2014 Kondo ..................... 523/156

FOREIGN PATENT DOCUMENTS

| JP | 2001-114939 | A |   | 4/2001 |
|----|-------------|---|---|--------|
| JP | 2001-114939 | A | * | 4/2001 |
| JP | 2005-126604 | A |   | 5/2005 |
| JP | 2005-126604 | A | * | 5/2005 |
| JP | 2005-325206 | A |   | 11/2005 |
| JP | 2005-325206 | A | * | 11/2005 |

* cited by examiner

*Primary Examiner* — Robert Harlan
(74) *Attorney, Agent, or Firm* — Birch, Stewart, Kolasch & Birch, LLP

(57) ABSTRACT

Provided is a pneumatic tire including a bead apex and/or sidewall reinforcing layer, which achieves balanced improvements in high-hardness properties, elongation at break, and self-heating properties to provide good run-flat durability while maintaining good processability. The pneumatic tire includes a bead apex and/or sidewall reinforcing layer formed from a rubber composition, the composition containing a rubber component (A) and carbon black (B), the rubber component (A) containing, per 100% by mass thereof: 10-75% by mass of a modified butadiene rubber (A1) with a cis content of 50% by mass or less; 5-40% by mass of a polybutadiene rubber (A2) containing 1,2-syndiotactic polybutadiene crystals; and 10-40% by mass of a diene rubber (A3) different from (A1) and (A2), the composition containing 35-65 parts by mass of carbon black (B) per 100 parts by mass of rubber component (A), the carbon black (B) having a BET specific surface area of 18-50 $m^2/g$.

7 Claims, No Drawings

PNEUMATIC TIRE

TECHNICAL FIELD

The present invention relates to a pneumatic tire. More specifically, the present invention relates to a pneumatic tire including a bead apex and/or a sidewall reinforcing layer each formed from a rubber composition.

BACKGROUND ART

In the preparation of rubber compositions for manufacturing bead apexes of tires, importance has been attached to increasing their complex elastic modulus (E*) to enhance handling stability. Also in recent years, the growing demand for more fuel-efficient cars has led to the need not only for rubber compositions for manufacturing treads that account for a large portion of a tire but also for rubber compositions for manufacturing bead apexes to have better fuel efficiency (low heat build-up properties).

One way of increasing E* is, for example, to use a large amount of carbon black with a large reinforcing effect, but in this case, fuel efficiency tends to be deteriorated. Meanwhile, to improve fuel efficiency of rubber compositions, a method of reducing the amount of carbon black or a method of using carbon black with a large particle size may be employed. These methods, however, decrease the E* of the rubber compositions. This decrease in E* is not desirable because it can cause reduction in handling stability and lateral rigidity of tires. Another proposed method for improving fuel efficiency involves using silica. This method, however, is not desirable either because it tends to decrease extrusion and building processabilities of rubber compositions. Thus, there is a need for a method capable of simultaneously ensuring E* and fuel efficiency.

Moreover, rubbers for sidewall reinforcing layers (inserts) for run-flat tires are expected to be capable of supporting the load of a vehicle to allow the vehicle to run a certain distance with the tire having no internal pressure after a puncture is made in the tire. Accordingly, high-hardness properties, elongation at break, and low self-heating properties are important factors. Also, since these rubbers use a large amount of modified polymer, it is also important that they have excellent processability before vulcanization.

A possible method to provide both high hardness and fuel efficiency is to reduce the amount of carbon black and add a large amount of crosslinking agent such as sulfur or accelerators. This method, however, unfortunately greatly decreases elongation at break and thus greatly reduces tensile strength. The method is also associated with the problem of reduced run-flat durability. Another possible method involves using low-grade carbon black such as FEF and GPF. However, unfortunately, this method cannot simultaneously provide high hardness and fuel efficiency and even decreases elongation at break. This method further involves the problem of reduced run-flat durability.

Patent Literatures 1 to 3 suggest the use of a modified rubber such as modified butadiene rubber or modified styrene-butadiene rubber to reduce rolling resistance. Still, these rubber compositions have room for improvement in terms of improving high-hardness properties, elongation at break, and self-heating properties and eventually run-flat durability while maintaining good processability.

CITATION LIST

Patent Literature

Patent Literature 1: JP 2001-114939 A
Patent Literature 2: JP 2005-126604 A
Patent Literature 3: JP 2005-325206 A

SUMMARY OF INVENTION

Technical Problem

An object of the present invention is to solve the above problems by providing a pneumatic tire including a bead apex and/or a sidewall reinforcing layer, which achieves balanced improvements in high-hardness properties, elongation at break, and self-heating properties to provide good run-flat durability while maintaining good processability.

Solution to Problem

The present invention relates to a pneumatic tire, including at least one of a bead apex and a sidewall reinforcing layer each formed from a rubber composition, the rubber composition containing a rubber component (A) and a carbon black (B), the rubber component (A) containing, based on 100% by mass of the rubber component (A): 10 to 75% by mass of a modified butadiene rubber (A1) with a cis content of 50% by mass or less; 5 to 40% by mass of a polybutadiene rubber (A2) containing 1,2-syndiotactic polybutadiene crystals; and 10 to 40% by mass of a diene rubber (A3) different from the rubbers (A1) and (A2), the composition containing 35 to 65 parts by mass of the carbon black (B) for each 100 parts by mass of the rubber component (A), the carbon black (B) having a BET specific surface area of 18 to 50 $m^2/g$.

The modified butadiene rubber (A1) is preferably at least one selected from the group consisting of a modified butadiene rubber (A1a) modified with a tin compound containing a tin atom-containing group, a modified butadiene rubber (A1b) modified with a compound containing an alkoxysilyl group, and a modified butadiene rubber (A1c) modified with a low molecular weight compound containing a glycidyl amino group within a molecule.

The diene rubber (A3) is preferably an isoprene-based rubber.

Preferably, an amount of reactive novolac phenolic resin in the rubber composition is 1 part by mass or less for each 100 parts by mass of the rubber component.

The rubber composition preferably contains, for each 100 parts by mass of the rubber component, 1.0 to 10 parts by mass of an alkylphenol-sulfur chloride condensate and 3.5 to 7.0 parts by mass of insoluble sulfur.

The rubber composition preferably contains a molten mixture of an alkylphenol-sulfur chloride condensate and a coumarone-indene resin.

The at least one of a bead apex and a sidewall reinforcing layer is preferably formed from the rubber composition by strip winding.

Advantageous Effects of Invention

The rubber composition of the present invention containing a rubber component with a specific compositional formulation and a specific amount of a specific carbon black achieves balanced improvements in high-hardness properties, elongation at break, and self-heating properties to provide good run-flat durability while maintaining good processability. Therefore, a pneumatic tire including a bead apex and/or a sidewall reinforcing layer each formed from such a rubber composition exhibits balanced improvements in high-hardness properties, elongation at break, and self-heating properties to provide good run-flat durability.

DESCRIPTION OF EMBODIMENTS

The present invention relates to a pneumatic tire including a bead apex and/or a sidewall reinforcing layer each formed from a rubber composition that contains: a rubber component (A) containing, based on 100% by mass of the rubber component, 10 to 75% by mass of a modified butadiene rubber (A1) with a cis content of 50% by mass or less, 5 to 40% by mass of a polybutadiene rubber (A2) containing 1,2-syndiotactic polybutadiene crystals, and 10 to 40% by mass of a diene rubber (A3) different from the rubbers (A1) and (A2); and 35 to 65 parts by mass of a carbon black (B) having a BET specific surface area of 18 to 50 m²/g, for each 100 parts by mass of the rubber component (A).

The use of such internal components in a pneumatic tire allows balanced improvements in high-hardness properties, elongation at break, and self-heating properties and thus provides good run-flat durability.

A pneumatic tire with high hardness can improve handling stability.

Also, a pneumatic tire with good run-flat durability means that the tire can support the load of a vehicle to allow the vehicle to run a certain distance with the tire having no internal pressure after a puncture is made in the tire.

The modified butadiene rubber (A1) has a cis content of 50% by mass or less, preferably 45% by mass or less, and more preferably 40% by mass or less. If the cis content is more than 50% by mass, low heat build-up properties may not be sufficient. The lower limit of the cis content is not particularly limited, but is preferably 5% by mass or more, and more preferably 10% by mass or more. If the cis content is less than 5% by mass, the composition may not have good processability.

The cis content (amount of cis component) of the modified butadiene rubber (A1) can be measured with a JNM-ECA series NMR device available from JEOL Ltd.

The weight average molecular weight (Mw) of the modified butadiene rubber (A1) is preferably 200,000 or more, and more preferably 400,000 or more. The modified butadiene rubber (A1) with an Mw of less than 200,000 may provide poor abrasion resistance and poor elongation at break. The Mw is preferably 900,000 or less, and more preferably 700,000 or less. The use of the modified butadiene rubber (A1) with an Mw of more than 900,000 may result in reduced processability leading to a deterioration in the dispersibility of carbon black, as well as poor elongation at break, poor crack growth resistance, and insufficiently low self-heating.

The molecular weight distribution (Mw/Mn) of the modified butadiene rubber (A1) is preferably 2 or less, and more preferably 1.5 or less. If the Mw/Mn is more than 2, the dispersibility of carbon black may deteriorate and tan δ tends to increase. The lower limit of the molecular weight distribution is not particularly limited, but is preferably 1 or more.

The weight average molecular weight (Mw) and the number average molecular weight (Mn) of the modified butadiene rubber (A1) can be determined with a gel permeation chromatograph (GPC) (GPC-8000 series from Tosoh Corporation, detector: differential refractometer, column: TSKGEL SUPERMULTIPORE HZ-M from Tosoh Corporation) relative to polystyrene standards.

The vinyl content of the modified butadiene rubber (A1) is preferably 50% by mass or less, and more preferably 20% by mass or less. If the vinyl content is more than 50% by mass, the dispersibility of carbon black may deteriorate and reduced elongation at break or an increased tan δ tends to be observed. The vinyl content is preferably 5% by mass or more, and more preferably 7% by mass or more. The modified butadiene rubber with a vinyl content of less than 5% by mass may be difficult to prepare.

The vinyl content of the modified butadiene rubber (A1) can be determined by infrared absorption spectroscopy.

The amount of the modified butadiene rubber (A1) based on 100% by mass of the rubber component is 10 to 75% by mass. The amount is preferably 15% by mass or more, more preferably 20% by mass or more, and still more preferably 40% by mass or more. Less than 10% by mass of the rubber (A1) tends to result in an increased tan δ and insufficiently low self-heating, as well as decreased elongation at break and poor run-flat durability. The amount is also preferably 70% by mass or less, and more preferably 65% by mass or less. More than 75% by mass of the rubber (A1) tends to decrease processability and elongation at break.

The modified butadiene rubber (A1) may be any butadiene rubber that is modified with a compound containing a functional group and has a cis content of 50% by mass or less. For example, the modified butadiene rubber (A1) may be a terminally modified butadiene rubber that has been modified with a compound (modifier) containing the functional group at at least one end of the butadiene rubber; a backbone-modified butadiene rubber having the functional group in the backbone; or a terminally and backbone-modified butadiene rubber having the functional group in the backbone and at an end (e.g., a terminally and backbone-modified butadiene rubber having the functional group in the backbone and modified with the above modifier at at least one end). The modified butadiene rubber (A1) is preferably a terminally modified butadiene rubber.

Examples of the functional groups include tin-atom containing groups and amino, amido, alkoxysilyl, isocyanato, imino, imidazole, urea, ether, carbonyl, oxycarbonyl, sulfide, disulfide, sulfonyl, sulfinyl, thiocarbonyl, ammonium, imido, hydrazo, azo, diazo, carboxyl, nitrile, pyridyl, alkoxy, hydroxy, oxy, and epoxy groups. These functional groups may be substituted. In particular, from the viewpoint of low heat build-up properties, the functional group is preferably a tin atom-containing group, a glycidyl amino group, an alkoxysilyl group (preferably a $C_1$-$C_6$ alkoxysilyl group), an alkoxy group (preferably a $C_1$-$C_6$ alkoxy group), a hydroxy group, or an epoxy group.

Particularly from the viewpoints of low heat build-up properties and processability, the modified butadiene rubber (A1) is more preferably modified (coupled) with a tin compound containing a tin atom-containing group (e.g., tin tetrachloride), a compound containing an alkoxysilyl group, or a low molecular weight compound containing a glycidyl amino group within a molecule. That is, in a suitable embodiment of the present invention, the modified butadiene rubber (A1) is at least one selected from the group consisting of a modified butadiene rubber (A1a) modified with a tin compound containing a tin atom-containing group, a modified butadiene rubber (A1b) modified with a compound containing an alkoxysilyl group, and a modified butadiene rubber (A1c) modified with a low molecular weight compound containing a glycidyl amino group within a molecule. Further, from the viewpoints of adhesion strength to carbon black and low heat build-up properties, the modified butadiene rubber (A1a) is particularly preferred. The use of the modified butadiene rubber (A1a) modified with a tin compound more improves low heat build-up properties and elongation at break to provide better run-flat durability.

Preferably, the modified butadiene rubber (A1a) is obtained by polymerizing 1,3-polybutadiene rubber using a lithium initiator and then adding a tin compound, and has a tin-carbon bond at a molecular end.

Examples of the lithium initiators include lithium compounds such as alkyllithiums, aryllithiums, allyllithium, vinyllithium, organotin-lithium compounds, and organonitrogen-lithium compounds. The use of such a lithium initiator in the polymerization of 1,3-polybutadiene rubber allows production of a modified butadiene rubber (A1a) with a high vinyl content and a low cis content.

The lithium initiators may be used alone or in combination of two or more.

Examples of the tin compounds include tin tetrachloride, butyltin trichloride, dibutyltin dichloride, dioctyltin dichloride, tributyltin chloride, triphenyltin chloride, diphenyldibutyltin, triphenyltin ethoxide, diphenyldimethyltin, ditolyltin chloride, diphenyltin dioctanoate, divinyldiethyltin, tetrabenzyltin, dibutyltin distearate, tetraallyltin, and p-tributyltin styrene. These tin compounds may be used alone or in combination of two or more.

The tin atom content in the modified butadiene rubber (A1a) is preferably 50 ppm or more, and more preferably 60 ppm or more. If the tin atom content is less than 50 ppm, the effect of promoting dispersion of carbon black in the modified butadiene rubber (A1a) may be reduced and tan δ tends to increase. The tin atom content is also preferably 3000 ppm or less, more preferably 2500 ppm or less, and still more preferably 250 ppm or less. If the tin atom content is more than 3000 ppm, extrusion processability of the kneaded mixture tends to deteriorate.

The modified butadiene rubber (A1b) is preferably a modified butadiene rubber obtained by polymerizing 1,3-polybutadiene rubber using a lithium initiator, followed by modification with a compound represented by the following formula (1) (hereinafter, such a rubber is also referred to as S-modified butadiene rubber).

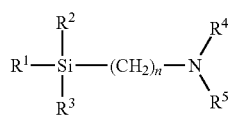

(1)

In the formula (1), $R^1$, $R^2$, and $R^3$ are the same as or different from one another, each representing an alkyl group, an alkoxy group, a silyloxy group, an acetal group, a carboxyl group (—COOH), a mercapto group (—SH), or a derivative thereof; $R^4$ and $R^5$ are the same as or different from one another, each representing a hydrogen atom or an alkyl group, and $R^4$ and $R^5$ may be joined to each other to form a ring structure together with the nitrogen atom; and n represents an integer of 0 or greater.

Examples of the S-modified butadiene rubbers include those as described in JP 2010-111753 A (which is incorporated by reference in its entirety).

In the above formula (1), for excellent elongation at break and sufficiently low self-heating, $R^1$, $R^2$, and $R^3$ are each suitably an alkoxy group (preferably a $C_1$-$C_8$, more preferably $C_1$-$C_4$ alkoxy group); $R^4$ and $R^5$ are each suitably an alkyl group (preferably a $C_1$-$C_3$ alkyl group); and n is preferably 1 to 5, more preferably 2 to 4, and still more preferably 3. When $R^4$ and $R^5$ are joined to each other to form a ring structure together with the nitrogen atom, the ring structure is preferably a 4 to 8 membered ring. Here, the alkoxy group includes cycloalkoxy groups (e.g. a cyclohexyloxy group) and aryloxy groups (e.g. a phenoxy group, a benzyloxy group). With a compound represented by the above formula (1), the effects of the present invention can be well achieved.

Examples of compounds represented by the above formula (1) include 2-dimethylaminoethyltrimethoxysilane, 3-dimethylaminopropyltrimethoxysilane, 2-dimethylaminoethyltriethoxysilane, 3-dimethylaminopropyltriethoxysilane, 2-diethylaminoethyltrimethoxysilane, 3-diethylaminopropyltrimethoxysilane, 2-diethylaminoethyltriethoxysilane, and 3-diethylaminopropyltriethoxysilane. In particular, in view of improving the above properties well, 3-dimethylaminopropyltrimethoxysilane, 3-dimethylaminopropyltriethoxysilane, and 3-diethylaminopropyltrimethoxysilane are preferred. These may be used alone or in combination of two or more.

Polybutadiene rubber may be modified with a compound (modifier) represented by the above formula (1) by a conventional method such as those described in JP H06-53768 B and JP H06-57767 B (which are incorporated by reference in their entirety). For example, the modification can be achieved by bringing polybutadiene rubber into contact with the compound. Specifically, mention may be made of a method of preparing polybutadiene rubber by anionic polymerization, adding a predetermined amount of the compound to the resulting rubber solution, and reacting the compound with the polymerizing end (active end) of the polybutadiene rubber.

The modified butadiene rubber (A1c) is preferably a modified butadiene rubber obtained by polymerizing 1,3-polybutadiene rubber using the above lithium initiator, followed by modification with a low molecular weight compound containing a glycidyl amino group within a molecule.

The low molecular weight compound may suitably be a low molecular weight compound represented by the following formula.

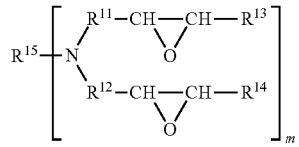

In the formula, $R^{11}$ and $R^{12}$ are the same as or different from each other, each representing a $C_1$-$C_{10}$ hydrocarbon group which may contain at least one selected from the group consisting of ether and tertiary amine groups; $R^{13}$ and $R^{14}$ are the same as or different from each other, each representing a hydrogen atom or a $C_1$-$C_{20}$ hydrocarbon group which may contain at least one selected from the group consisting of ether and tertiary amine groups; $R^{15}$ represents a $C_1$-$C_{20}$ hydrocarbon group which may contain at least one selected from the group consisting of ether, tertiary amine, epoxy, carbonyl, and halogen groups; and m represents an integer of 1 to 6.

In the above formula, $R^{11}$ and $R^{12}$ are each preferably a $C_1$-$C_{10}$ (preferably $C_1$-$C_3$) alkylene group, and $R^{13}$ and $R^{14}$ are each preferably a hydrogen atom. $R^{15}$ may be a $C_3$-$C_{20}$ (preferably $C_6$-$C_{10}$, more preferably $C_8$) hydrocarbon group, and is preferably a cycloalkyl or cycloalkylene group as represented by, for example, the following formulas, and more preferably a cycloalkylene group.

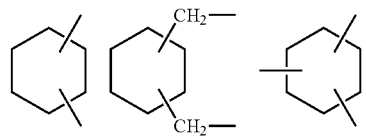

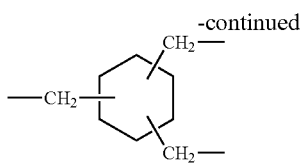

Moreover, m in the above formula is preferably 2 or 3.

Suitable examples of the compound represented by the above formula include tetraglycidylmetaxylenediamine, tetraglycidylaminodiphenylmethane, tetraglycidyl-p-phenylenediamine, diglycidylaminomethylcyclohexane, and tetraglycidyl-1,3-bisaminomethylcyclohexane.

The modified butadiene rubber (A1c) is more preferably a modified butadiene rubber obtained by polymerizing 1,3-polybutadiene rubber using the above lithium initiator, followed by modification with a mixture of a low molecular weight compound containing a glycidyl amino group within a molecule and a dimer or higher oligomer of the low molecular weight compound (hereinafter, such a rubber is also referred to as A-modified butadiene rubber).

Examples of the A-modified butadiene rubbers include those as described in JP 2009-275178 A (which is incorporated by reference in its entirety).

The oligomer is preferably a dimer to decamer of the low molecular weight compound. The low molecular weight compound refers to an organic compound having a molecular weight of 1000 or less, and may suitable be a compound represented by the following formula (2).

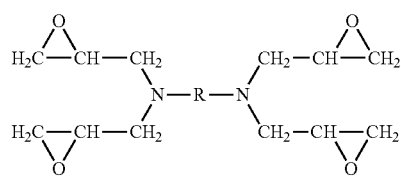

In the above formula (2), R is a divalent hydrocarbon group or a divalent organic group containing at least one polar group selected from the group consisting of oxygen-containing polar groups (e.g. ether, epoxy, ketone), sulfur-containing polar groups (e.g. thioether, thioketone), and nitrogen-containing polar groups (e.g. tertiary amino group, imino group).

The divalent hydrocarbon group for R may be a saturated or unsaturated linear, branched, or cyclic group, such as alkylene, alkenylene, and phenylene groups. Specific examples thereof include methylene, ethylene, butylene, cyclohexylene, 1,3-bis(methylene)-cyclohexane, 1,3-bis(ethylene)-cyclohexane, o-phenylene, m-phenylene, p-phenylene, m-xylene, p-xylene, and bis(phenylene)-methane.

Specific examples of the low molecular weight compound represented by the above formula (2) include tetraglycidyl-1,3-bisaminomethylcyclohexane, N,N,N',N'-tetraglycidyl-m-xylenediamine, 4,4-methylene-bis(N,N-diglycidylaniline), 1,4-bis(N,N-diglycidylamino)cyclohexane, N,N,N',N'-tetraglycidyl-p-phenylenediamine, 4,4'-bis(diglycidylamino)benzophenone, 4-(4-glycidylpiperazinyl)-(N,N-diglycidyl)aniline, and 2-[2-(N,N-diglycidylamino)ethyl]-1-glycidylpyrrolidine. Preferred among these is tetraglycidyl-1,3-bisaminomethylcyclohexane.

The oligomer component may suitably be a dimer represented by the following formula (3) or a trimer represented by the following formula (4).

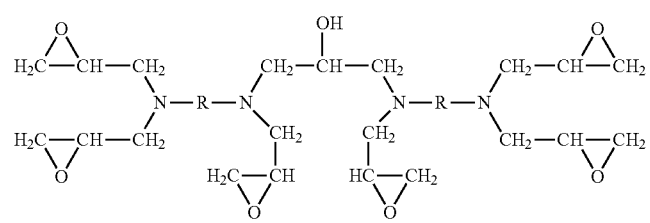

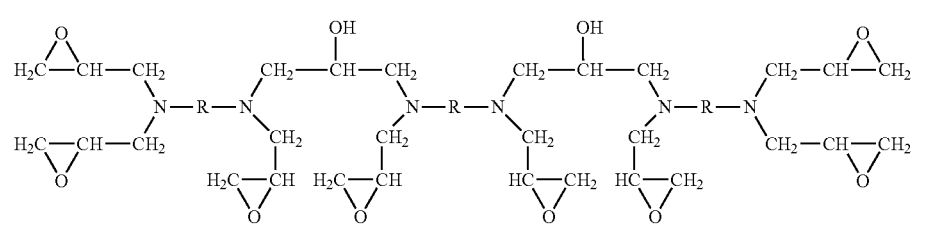

In the case of modification with a mixture of the low molecular weight compound and the oligomer, the modifier (mixture) preferably contains, based on 100% by mass thereof, 75 to 95% by mass of the low molecular weight compound and 25 to 5% by mass of the oligomer.

The ratio between the low molecular weight compound and the oligomer component in the modifier can be determined by GPC.

Specifically, a column allowing analysis of substances ranging from the low molecular weight compound to the oligomer component is selected and used to analyze them. From peaks observed in the analysis, the ratio between the area of the lower molecular weight component and the area of the higher molecular weight component is calculated by vertically drawing a line down from the first inflection point on the high molecular weight side of the peak derived from the low molecular weight compound. This area ratio corresponds to the ratio between the low molecular weight compound and the oligomer component.

It should be noted that the peak on the high molecular weight side from the oligomer component is subjected to integration until a point corresponding to a molecular weight that reaches no more than 10 times the molecular weight of the low molecular weight compound determined relative to polystyrene standards, or a point at which the component peak reaches 0 if the component peak reaches 0 before the point corresponding to a molecular weight that reaches no more than 10 times the molecular weight of the low molecular weight compound.

The reaction between the modifier and the butadiene polymer having an active end synthesized by anionic polymerization using a polymerization initiator such as a lithium compound is carried out by reacting the modifier with the active end of the polymer. The modification of polybutadiene rubber with the low molecular weight compound containing a glycidyl amino group within a molecule or with the mixture of the compound and its oligomer can be carried out in accordance with the method for modification with the compound (modifier) represented by the formula (1).

The polybutadiene rubber (A2) containing 1,2-syndiotactic polybutadiene crystals (hereinafter also referred to as SPB-containing BR) may be one commonly used in the tire industry, and is preferably one in which 1,2-syndiotactic polybutadiene crystals chemically bonded to polybutadiene rubber are dispersed. The 1,2-syndiotactic polybutadiene crystals contained give a sufficient complex elastic modulus and improves rigidity, thus resulting in good handling stability.

The melting point of the 1,2-syndiotactic polybutadiene crystals is preferably 180° C. or higher, and more preferably 190° C. or higher. With a melting point lower than 180° C., the 1,2-syndiotactic polybutadiene crystals may melt during rubber kneading, resulting in reduced rigidity. Also, the melting point is preferably 220° C. or lower, and more preferably 210° C. or lower. With a melting point higher than 220° C., the crystals tend to exhibit poor dispersibility in the rubber composition.

The amount of insolubles in boiling n-hexane in the SPB-containing BR is preferably 2.5% by mass or more, and more preferably 8% by mass or more. The SPB-containing BR with less than 2.5% by mass of insolubles in boiling n-hexane may not provide sufficient hardness to the rubber composition. The amount of insolubles in boiling n-hexane is also preferably 22% by mass or less, more preferably 20% by mass or less, and still more preferably 18% by mass or less. The polybutadiene rubber with more than 22% by mass of insolubles itself tends to have a high viscosity, resulting in poor dispersibility of the polybutadiene rubber as well as filler in the rubber composition.

The insolubles in boiling n-hexane refers to 1,2-syndiotactic polybutadiene in the SPB-containing BR.

The amount of 1,2-syndiotactic polybutadiene crystals in the SPB-containing BR is preferably 2.5% by mass or more, and more preferably 10% by mass or more. The SPB-containing BR with less than 2.5% by mass of 1,2-syndiotactic polybutadiene crystals may not sufficiently improve rigidity. The amount is preferably 20% by mass or less, and more preferably 18% by mass or less. The SPB-containing BR with more than 20% by mass of 1,2-syndiotactic polybutadiene crystals tends to be difficult to disperse in the rubber composition.

The cis content in the SPB-containing BR is preferably 90% by mass or more, more preferably 93% by mass or more, and still more preferably 95% by mass or more. If the cis content is less than 90% by mass, then abrasion resistance and elongation at break may be reduced.

The cis content (amount of cis component) in the SPB-containing BR can be measured with a JNM-ECA series NMR device available from JEOL Ltd.

The amount of the SPB-containing BR based on 100% by mass of the rubber component is 5 to 40% by mass. The use of the SPB-containing BR in such a range improves the texture of the rubber compound for strip winding or the texture of the conventional sheet extrudate during extrusion of the rubber composition, contributing to good run-flat durability. The amount of the SPB-containing BR is preferably 7% by mass or more, and more preferably 10% by mass or more. Less than 5% by mass of the SPB-containing BR may provide reduced processability and may not sufficiently improve rigidity. The amount of the SPB-containing BR is preferably 35% by mass or less, more preferably 30% by mass or less, still more preferably 20% by mass or less, and particularly preferably 15% by mass or less. The use of more than 40% by mass of the SPB-containing BR corresponds to a reduced proportion of the other rubbers, which may make it impossible to achieve balanced improvements in high-hardness properties, elongation at break, and self-heating properties. Particularly, self-heating properties tend to be insufficient and elongation at break tends to decrease.

Examples of the diene rubbers (A3) different from the rubbers (A1) and (A2) include natural rubber (NR), polyisoprene rubber (IR), styrene-butadiene rubber (SBR), high-cis 1,4-polybutadiene rubber other than the modified butadiene rubber (A1) and SPB-containing BR (A2), and epoxidized natural rubber (ENR). Preferred among these are isoprene-based rubbers such as NR, IR, and ENR, from the viewpoints of elongation at break and processability. Thus, in another suitable embodiment of the present invention, the diene rubber (A3) is an isoprene-based rubber. In particular, polyisoprene rubber is particularly preferred because it has a lower molecular weight, has stable tackiness and viscosity, and has a small amount of impurities.

The above high-cis 1,4-polybutadiene rubber refers to a polybutadiene rubber having a cis-1,4-butadiene content of 90% or higher.

The NR is not particularly limited, and may be one commonly used in the rubber industry, such as RSS#3, TSR20, and UPNR.

The IR is not particularly limited either, and may be one commonly used in the tire industry.

The amount of the diene rubber (A3) based on 100% by mass of the rubber component is 10 to 40% by mass. The use of the diene rubber (A3) in such a range improves elongation at break of the rubber composition and also improves the cohesiveness of the discharged kneaded rubber compound, making the rubber compound less likely to break even when a tensile stress is applied before and during building. The amount of the diene rubber (A3) is preferably 12% by mass or more, and more preferably 15% by mass or more. The use of less than 10% by mass of the diene rubber (A3) may not provide sufficient elongation at break and may result in reduced tackiness and deteriorated processability. The amount of the diene rubber (A3) is preferably 35% by mass or less, and more preferably 30% by mass or less. If the amount is more than 40% by mass, tan δ tends to increase and hardness may be insufficient. Additionally, the proportion of the other rubbers is reduced, which may make it impossible to achieve balanced improvements in high-hardness properties, elongation at break, and self-heating properties.

The rubber component may further contain modified styrene-butadiene rubber (modified SBR).

The modified styrene-butadiene rubber may be one obtained by replacing the polybutadiene rubber forming the skeleton of the above modified butadiene rubber (A1b) by styrene-butadiene rubber. In particular, the modified styrene-butadiene rubber is preferably a solution-polymerized styrene-butadiene rubber modified with a compound represented by the above formula (1) (hereinafter also referred to as S-modified styrene-butadiene rubber), and particularly suitably one obtained by modifying the polymerizing end (active end) of solution-polymerized styrene-butadiene rubber with a compound represented by the above formula (1) (e.g., the modified styrene-butadiene rubber described in JP 2010-111753 A (which is incorporated by reference in its entirety)).

The bound styrene content in modified styrene-butadiene rubber is preferably 40% by mass or less, more preferably 38% by mass or less, and still more preferably 36% by mass or less. If the bound styrene content is more than 40% by mass, then self-heating may not be sufficiently reduced. The bound styrene content is also preferably 8% by mass or more, and more preferably 10% by mass or more. If the bound styrene content is less than 8% by mass, reversion resistance and high-temperature tensile properties tend to deteriorate.

The bound styrene content in modified styrene-butadiene rubber can be measured with a JNM-ECA series NMR device available from JEOL Ltd.

In the case that the rubber component contains modified styrene-butadiene rubber, the amount of modified styrene-butadiene rubber based on 100% by mass of the rubber component is preferably 8% by mass or more, more preferably 15% by mass or more, and still more preferably 20% by mass or more. Less than 8% by mass of modified styrene-butadiene rubber may not sufficiently provide reversion resistance and high-temperature tensile properties. Also, the amount is preferably 75% by mass or less, more preferably 72% by mass or less, and still more preferably 70% by mass or less. The use of more than 75% by mass of modified styrene-butadiene rubber tends to result in reduced elongation at break and insufficiently low self-heating. In the case where heat build-up can be sufficiently reduced with the modified butadiene rubber, however, sufficient run-flat durability can be achieved without modified SBR.

The rubber composition of the present invention contains a carbon black (B) having a BET specific surface area of 18 to 50 $m^2/g$. Adding such a carbon black provides good low heat build-up properties and a good reinforcing effect, favorably contributing to the effects of the present invention. These types of carbon black may be used alone or in combination of two or more.

The BET specific surface area of the carbon black (B) is 18 to 50 $m^2/g$. The BET specific surface area is preferably 20 $m^2/g$ or larger, and more preferably 30 $m^2/g$ or larger. A carbon black with a BET specific surface area of smaller than 18 $m^2/g$ may not produce a sufficient reinforcing effect. The BET specific surface area is also preferably 45 $m^2/g$ or smaller, and more preferably 40 $m^2/g$ or smaller. If the BET specific surface area is larger than 50 $m^2/g$, heat build-up properties tend to deteriorate, resulting in poor fuel efficiency, poor elongation at break at high temperatures, and poor run-flat durability.

The BET specific surface area of carbon black can be determined in accordance with JIS K6217-2:2001.

The dibutyl phthalate oil absorption (COAN) of the carbon black (B) is preferably 50 ml/100 g or more, more preferably 60 ml/100 g or more, and still more preferably 70 ml/100 g or more. A carbon black with a COAN of less than 50 ml/100 g may not produce a sufficient reinforcing effect. The COAN is also preferably 200 ml/100 g or less, more preferably 135 ml/100 g or less, and still more preferably 90 ml/100 g or less. A carbon black with a COAN of more than 200 ml/100 g may reduce processability.

The COAN of carbon black can be determined in accordance with JIS K6217-4:2001.

The amount of the carbon black (B) for each 100 parts by mass of the rubber component (A) is 35 to 65 parts by mass. The amount is preferably 40 parts by mass or more, and more preferably 45 parts by mass or more. The use of less than 35 parts by mass of the carbon black (B) may result in shrink after extrusion and before building and therefore reduced processability, and also tends to lead to reduced elongation at break (EB). The amount is also preferably 60 parts by mass or less, and more preferably 55 parts by mass or less. More than 65 parts by mass of the carbon black (B) tends to deteriorate heat build-up properties, resulting in poor fuel efficiency and poor run-flat durability.

The rubber composition of the present invention may contain silica. The use of silica more improves scorch resistance, self-heating properties, and elongation at break (EB). Examples of the silica include dry silica (anhydrous silica) and wet silica (hydrous silica). In particular, wet silica is preferred because it has a large number of silanol groups.

The BET specific surface area of silica is preferably 40 $m^2/g$ or larger, more preferably 70 $m^2/g$ or larger, and still more preferably 110 $m^2/g$ or larger. A silica with a BET specific surface area of smaller than 40 $m^2/g$ tends to provide reduced tensile strength. The BET specific surface area of silica is also preferably 220 $m^2/g$ or smaller, and more preferably 200 $m^2/g$ or smaller. A silica with a BET specific surface area of larger than 220 $m^2/g$ may be difficult to disperse, resulting in deteriorated processability.

The BET specific surface area values of silica are determined by the BET method in accordance with ASTM D3037-93.

In the case that the rubber composition contains silica, the amount of silica for each 100 parts by mass of the rubber component is preferably 10 parts by mass or more, more preferably 12 parts by mass or more, and still more preferably 15 parts by mass or more. The use of less than 10 parts by mass of silica may not be sufficiently effective. The amount is also preferably 65 parts by mass or less, more preferably 55 parts by mass or less, and still more preferably 50 parts by mass or less. More than 65 parts by mass of silica may be difficult to disperse, resulting in reduced processability and reduced elongation at break at high temperatures.

In the case that the rubber composition contains silica, the rubber composition preferably contains a silane coupling agent together with the silica.

The silane coupling agent may be any silane coupling agent usually used with silica in the rubber industry. Examples thereof include sulfide silane coupling agents such as bis(3-triethoxysilylpropyl)disulfide, mercapto silane coupling agents such as 3-mercaptopropyltrimethoxysilane, vinyl silane coupling agents such as vinyltriethoxysilane, amino silane coupling agents such as 3-aminopropyltriethoxysilane, glycidoxy silane coupling agents such as γ-glycidoxypropyltriethoxysilane, nitro silane coupling agents such as 3-nitropropyltrimethoxysilane, and chloro silane coupling agents such as 3-chloropropyltrimethoxysilane. In particular, sulfide silane coupling agents are preferred, and bis(3-triethoxysilylpropyl)disulfide is more preferred.

The amount of silane coupling agent for each 100 parts by mass of silica is preferably 0.1 parts by mass or more, and more preferably 0.5 parts by mass or more. The use of less than 0.1 parts by mass of silane coupling agent tends to result in greatly reduced elongation at break. The amount of silane coupling agent is also preferably 10 parts by mass or less, and more preferably 8 parts by mass or less. More than 10 parts by mass of silane coupling agent tends not to produce an effect proportional to the increase in cost.

The rubber composition of the present invention is preferably substantially free from reactive novolac phenolic resins. It is not preferred to use such phenolic resins especially in a sidewall reinforcing layer, because they have high heat build-up properties and therefore decrease run-flat durability.

The reactive novolac phenolic resin refers to a resin that is obtained by a condensation reaction of a phenol such as phenol and an aldehyde such as formaldehyde and that reacts with a methylene donor or the like to accelerate polymer crosslinking. The reactive novolac phenolic resin may be modified.

For example, in the rubber composition of the present invention, the amount of reactive novolac phenolic resin for each 100 parts by mass of the rubber component is preferably 2 parts by mass or less, more preferably 1 part by mass or less, and still more preferably 0.5 parts by mass or less. It is particularly preferred that the rubber composition of the present invention be free from reactive novolac phenolic resins.

Examples of the reactive novolac phenolic resins include novolac phenolic resins such as SUMILITE resins PR-12686 (cashew-modified phenolic resin, softening point: 94° C.) and PR-50731 (non-modified, softening point: 120° C.) from Sumitomo Bakelite Co., Ltd.

The rubber composition of the present invention preferably contains an alkylphenol-sulfur chloride condensate. The use of an alkylphenol-sulfur chloride condensate increases the hardness of the rubber composition, favorably contributing to simultaneous provision of high-hardness properties, heat build-up properties, and elongation at break. Usually, for example, PK900 and HTS both from Flexsys and KA9188 from Bayer, which are hybrid crosslinking agents, are also used as crosslinking agents with similar properties, but the alkylphenol-sulfur chloride condensate is better than them in terms of tan δ.

The alkylphenol-sulfur chloride condensate is not particularly limited, but is preferably a compound represented by the formula (5) below, in view of providing good heat build-up properties, good hardness and the like, as well as elongation at break.

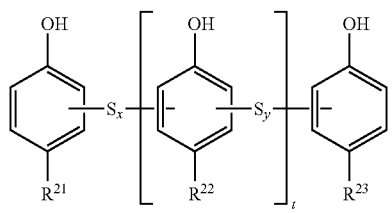

(5)

In the formula (5), $R^{21}$, $R^{22}$, and $R^{23}$ are the same as or different from one another, each representing a $C_4$-$C_{12}$ alkyl group; x and y are the same as or different from each other, each representing an integer of 2 to 4; and t represents an integer of 0 to 500.

The symbol t in the formula (5) is preferably an integer of 10 to 400, and more preferably an integer of 42 to 300, in view of allowing the alkylphenol-sulfur chloride condensate to disperse well in the rubber component and more suitably achieving the effects of the present invention. The symbols x and y are preferably both 2 in view of efficiently providing high hardness and more suitably achieving the effects of the present invention. $R^{21}$ to $R^{23}$ are each preferably a $C_4$-$C_{12}$ alkyl group, more preferably a $C_6$-$C_{12}$ alkyl group, and still more preferably a $C_8$-$C_{12}$ alkyl group, in view of allowing the alkylphenol-sulfur chloride condensate to disperse well in the rubber component and more suitably achieving the effects of the present invention.

The weight average molecular weight (Mw) of the alkylphenol-sulfur chloride condensate is preferably 8,000 to 100,000, more preferably 9,000 to 80,000, still more preferably 10,000 to 70,000, and particularly preferably 11,000 to 59,000. If the Mw is less than 8,000, hygroscopic stability, scorch resistance, low heat build-up properties, handling stability, and elongation at break may be insufficient. If the Mw is more than 100,000, the dispersibility of the alkylphenol-sulfur chloride condensate tends to deteriorate, and productivity and low heat build-up properties may be reduced.

The weight average molecular weight (Mw) of the alkylphenol-sulfur chloride condensate can be determined with a gel permeation chromatograph (GPC) (GPC-8000 series from Tosoh Corporation; detector: differential refractometer; column: TSKGEL SUPERMULTIPORE HZ-M from Tosoh Corporation) relative to polystyrene standards.

The softening point of the alkylphenol-sulfur chloride condensate is preferably 60° C. to 127° C., more preferably 80° C. to 127° C., still more preferably 85° C. to 125° C., and particularly preferably 90° C. to 120° C. The alkylphenol-sulfur chloride condensate with a softening point higher than 127° C. tends to exhibit poor dispersibility. The alkylphenol-sulfur chloride condensate with a softening point lower than 60° C. tends to exhibit poor dispersibility and to deteriorate hygroscopic stability.

When the softening point falls within the temperature range mentioned above, the effects of the present invention can be more suitably achieved.

The softening point of the alkylphenol-sulfur chloride condensate refers to a temperature at which a ball drops in the measurement of the softening point specified in JIS K 6220-1:2001 with a ring and ball softening point measuring apparatus.

The alkylphenol-sulfur chloride condensate can be prepared by a known method, such as by reacting an alkylphenol and sulfur chloride at a molar ratio of, for example, 1:0.9-1.25. Specific examples of the alkylphenol-sulfur chloride condensate include TACKIROL V200 (compound represented by the formula (6) below), TS3108, TS3109 and TS3101 all from Taoka Chemical Co., Ltd., and Vultac 3 from Arkema.

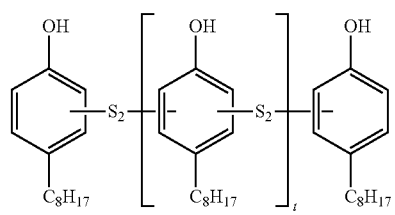

(6)

In the above formula (6), t represents an integer of 0 to 100.

If the rubber composition of the present invention contains the alkylphenol-sulfur chloride condensate, the amount of the alkylphenol-sulfur chloride condensate for each 100 parts by mass of the rubber component is preferably 1.0 part by mass or more, more preferably 1.5 parts by mass or more, and still more preferably 2.0 parts by mass or more. Also, when the composition has a scorch time of 8.0 minutes or longer and thus has no problem with processability, the amount of the alkylphenol-sulfur chloride condensate is particularly preferably 5.0 parts by mass or more. Less than 1.0 part by mass of the alkylphenol-sulfur chloride condensate may fail to provide a sufficient crosslink density and to be sufficiently effective in improving handling stability, and also may not sufficiently reduce self-heating. The amount is preferably 10 parts by mass or less, and more preferably 8.0 parts by mass or less. More than 10 parts by mass of the alkylphenol-sulfur chloride condensate may excessively increase the curing rate to cause rubber scorch. Also in this case, elongation at break at high temperatures rather tends to decrease.

The rubber composition of the present invention also preferably contains a molten mixture of an alkylphenol-sulfur chloride condensate and a coumarone-indene resin in place of or as a partial substitute for the alkylphenol-sulfur chloride condensate. The use of the molten mixture allows the rubber composition to have better scorch resistance (appropriately long scorch time) and better elongation at break, and the molten mixture provides better elongation at break than a molten mixture of the alkylphenol-sulfur chloride condensate and oil. Moreover, the use of the alkylphenol-sulfur chloride condensate in the form of a molten mixture more improves low heat build-up properties and elongation at break to provide better run-flat durability than in the case of simply adding the alkylphenol-sulfur chloride condensate.

This alkylphenol-sulfur chloride condensate may be as described above.

The coumarone-indene resin refers to a resin containing (or mainly formed from) coumarone and indene as monomers constituting the skeleton (backbone) of the resin, and examples of trace monomers other than coumarone and indene that may be contained in the skeleton include styrene, α-methylstyrene, methylindene, and vinyltoluene.

The softening point of the coumarone-indene resin is preferably −20° C. to 140° C., more preferably −20° C. to 105° C., still more preferably −15° C. to 80° C., particularly preferably −10° C. to 60° C., most preferably −5° C. to 45° C., and further preferably 0° C. to 18° C. The coumarone-indene resin with a softening point higher than 140° C. tends to deteriorate low heat build-up properties. The coumarone-indene resin with a softening point lower than −20° C. may have a volatility high enough to easily volatilize the molten mixture, making it impossible to sufficiently achieve the effects of the present invention. When the softening point falls within the temperature range mentioned above, and particularly a temperature range from −20° C. to 45° C., the effects of the present invention can be more suitably achieved with better low heat build-up properties and better elongation at break.

The softening point of the coumarone-indene resin refers to a temperature at which a ball drops in the measurement of the softening point specified in JIS K 6220-1:2001 with a ring and ball softening point measuring apparatus.

In the molten mixture, the mass ratio of the coumarone-indene resin and the alkylphenol-sulfur chloride condensate (coumarone-indene resin/alkylphenol-sulfur chloride condensate) is preferably 0.02 to 0.50, more preferably 0.02 to 0.30, and still more preferably 0.04 to 0.25, because then the effects of the present invention can be more suitably achieved. If the mass ratio is higher than 0.50, property stability may be reduced so that the molten mixture can have a softening point outside the later-described suitable range (particularly from 80° C. to 127° C.), which may not allow the effects of the present invention to be sufficiently achieved. Also, the molten mixture with a mass ratio of lower than 0.02 may not provide good scorch resistance and may be insufficiently effective in improving elongation at break.

The molten mixture can be prepared by mixing the alkylphenol-sulfur chloride condensate and the coumarone-indene resin at a temperature of not lower than the respective melting temperatures. For example, melt-mixing may be performed at 150° C. to 250° C. for 5 to 30 minutes (e.g., at 200° C. for 10 minutes). The melt-mixing can be carried out using a known heating device and a known mixing device. For example, the molten mixture may be prepared by melting the alkylphenol-sulfur chloride condensate and the coumarone-indene resin with stirring under heat in, for example, an oil bath or a thermal chamber.

The obtained molten mixture is preferably in a non-viscous solid state at room temperature (23° C.) and preferably up to about 60° C., from the viewpoints of automatic metering and handling by hand.

The softening point of the molten mixture is preferably 60° C. to 127° C., more preferably 80° C. to 127° C., still more preferably 85° C. to 125° C., and particularly preferably 90° C. to 120° C. The molten mixture with a softening point higher than 127° C. tends to exhibit poor dispersibility. The molten mixture with a softening point lower than 60° C. tends to exhibit poor dispersibility and to deteriorate hygroscopic stability.

When the softening point falls within the temperature range mentioned above, the effects of the present invention can be more suitably achieved.

The softening point of the molten mixture can be adjusted within the above range by controlling the mass ratio of the coumarone-indene resin and the alkylphenol-sulfur chloride condensate, or the softening point or weight average molecular weight of the coumarone-indene resin or alkylphenol-sulfur chloride condensate used. A person skilled in the art could appropriately control these values.

The softening point of the molten mixture can be determined in the same manner as mentioned for the softening point of the coumarone-indene resin.

The weight average molecular weight (Mw) of the alkylphenol-sulfur chloride condensate in the molten mixture is preferably 8,000 to 100,000, more preferably 9,000 to 80,000, still more preferably 10,000 to 70,000, and particularly preferably 11,000 to 59,000. If the Mw is less than 8,000, then hygroscopic stability, scorch resistance, low heat build-up properties, handling stability, and elongation at break may be insufficient. If the Mw is more than 100,000, the molten mixture tends to exhibit poor dispersibility, and productivity and low heat build-up properties may be reduced.

The weight average molecular weight (Mw) of the alkylphenol-sulfur chloride condensate in the molten mixture can be measured in the same manner as mentioned above for the weight average molecular weight of the alkylphenol-sulfur chloride condensate.

The amount of the molten mixture for each 100 parts by mass of the rubber component is preferably 0.2 parts by mass or more, more preferably 0.25 parts by mass or more, still more preferably 0.5 parts by mass or more, and particularly preferably 1.0 part by mass or more. Less than 0.2 parts by mass of the molten mixture may not sufficiently contribute to the effects of the present invention. The amount of the molten mixture is also preferably 20 parts by mass or less, more preferably 15 parts by mass or less, still more preferably 10 parts by mass or less, and particularly preferably 8.0 parts by mass or less. More than 20 parts by mass of the molten mixture may decrease scorch resistance and elongation at break.

In the case that the rubber composition of the present invention contains the molten mixture, an alkylphenol-sulfur chloride condensate and/or a coumarone-indene resin may be added separately from the molten mixture.

The rubber composition according to the present invention may contain vulcanizing agents commonly used in the rubber industry, such as powder sulfur, precipitated sulfur, colloidal sulfur, insoluble sulfur, and highly dispersible sulfur. In particular, insoluble sulfur is preferred. Moreover, the amount of insoluble sulfur for each 100 parts by mass of the rubber component is preferably 3.5 parts by mass or more, more preferably 4.0 parts by mass or more, still more preferably 4.5 parts by mass or more, and particularly preferably 5.0 parts by mass or more. Also, the amount is preferably 7.0 parts by mass or less, and more preferably 6.0 parts by mass or less. The use of insoluble sulfur in the range mentioned above allows simultaneous provision of high-hardness properties, heat build-up properties, and elongation at break. Less than 3.5 parts by mass of insoluble sulfur tends to result especially in low hardness and poor elongation at break at high temperatures. More than 7.0 parts by mass of insoluble sulfur may be less likely to increase hardness and may rather cause the problems of sulfur blooming and reduced tackiness.

The amount of insoluble sulfur as used herein refers to the net sulfur content in insoluble sulfur.

In addition to the above components, the rubber composition of the present invention may contain compounding agents conventionally used in the rubber industry according to need, such as resin, stearic acid, zinc oxide, an antioxidant, and a vulcanization accelerator.

The zinc oxide is preferably used in an amount of 6 to 12 parts by mass for each 100 parts by mass of the rubber component in order to prevent sulfur blooming and an associated decrease in the tackiness of the extrudate. The use of zinc oxide in such a range results in better processability and low heat build-up properties. The amount is more preferably 7 parts by mass or more.

Moreover, sulfur becomes less likely to bloom during processing as the mixture ratio of zinc oxide to insoluble sulfur increases, although the mixture ratio depends on how thinly the rubber compound is rolled at a high temperature in extrusion. For example, for use in a sidewall reinforcing layer or a bead apex, the mixture ratio of zinc oxide and insoluble sulfur (zinc oxide/insoluble sulfur) is preferably 1.0 or higher, and more preferably 1.15 or higher.

Examples of the vulcanization accelerators include guanidine compounds, aldehyde-amine compounds, aldehyde-ammonia compounds, thiazole compounds, sulfenamide compounds, thiourea compounds, thiuram compounds, dithiocarbamate compounds, and xanthate compounds. These vulcanization accelerators may be used alone or in combination of two or more. In particular, compounds represented by the formula (7) below are preferred because they more suitably prevent decrease in scorch time, improve low heat build-up properties and elongation at break, and enhance durability.

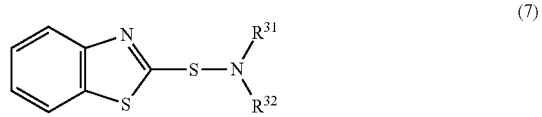

(7)

In the formula (7), $R^{31}$ represents a $C_2$-$C_{16}$ alkyl group; and $R^{32}$ represents a $C_3$-$C_{16}$ alkyl group having a branched structure or a benzothiazolyl sulfide group.

The alkyl group for $R^{31}$ in the formula (7) preferably has a branched structure. The alkyl group having a branched structure is preferably as mentioned for the later-described $C_3$-$C_{16}$ alkyl group having a branched structure for $R^{32}$.

The number of carbon atoms of the alkyl group for $R^{31}$ in the formula (7) is preferably 4 to 16, and more preferably 4 to 12. If the number of carbon atoms is less than 2, the compound tends to be adsorbed, while if the number of carbon atoms is 17 or more, hardness tends to be reduced.

Preferred examples of the alkyl group for $R^{31}$ in the formula (7) include ethyl, t-butyl, 2-ethylhexyl, 2-methylhexyl, 3-ethylhexyl, 3-methylhexyl, 2-ethylpropyl, 2-ethylbutyl, 2-ethylpentyl, 2-ethylheptyl, and 2-ethyloctyl groups.

The $C_3$-$C_{16}$ alkyl group having a branched structure for $R^{32}$ in the formula (7) is preferably one having a branched structure obtained by replacing at least one of the hydrogen atoms forming a carbon chain $(CH_2)_k$ in a linear alkyl group represented by —$(CH_2)_k$—$CH_3$ (wherein k is an integer of 1 to 14) by an alkyl group (i.e., a linear alkyl group having a branched structure).

The number of carbon atoms of the alkyl group having a branched structure for $R^{32}$ in the formula (7) is preferably 4 to 16, and more preferably 6 to 12. If the number of carbon atoms is less than 3, the compound tends to be adsorbed, while if the number of carbon atoms is 17 or more, hardness tends to be reduced.

Preferred examples of the alkyl group for $R^{32}$ in the formula (7) include t-butyl, 2-ethylhexyl, 2-methylhexyl, 3-ethylhexyl, 3-methylhexyl, 2-ethylpropyl, 2-ethylbutyl, 2-ethylpentyl, 2-ethylheptyl, and 2-ethyloctyl groups.

The benzothiazolyl sulfide group for $R^{32}$ in the formula (7) refers to a group represented by the following formula.

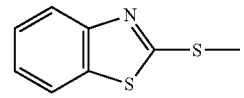

$R^{32}$ in the above formula (7) is preferably a benzothiazolyl sulfide group. Moreover, for excellent hardness, $R^{32}$ is preferably a benzothiazolyl sulfide group in the case that $R^{31}$ is a t-butyl group.

Examples of the compounds represented by the above formula (7) include BEHZ (N,N-di(2-ethylhexyl)-2-benzothiazolylsulfenamide) from Kawaguchi Chemical Industry Co., Ltd., BMHZ (N,N-di(2-methylhexyl)-2-benzothiazolylsulfenamide) from Kawaguchi Chemical Industry Co., Ltd., Santocure TBSI (N-tert-butyl-2-benzothiazolylsulfeneimide) from Flexsys, and ETZ (N-ethyl-N-t-butylbenzothiazole-2-sulfenamide) from Ouchi Shinko Chemical Industrial Co., Ltd.

The amount of vulcanization accelerator for each 100 parts by mass of the rubber component is preferably 0.5 parts by mass or more, more preferably 1.0 part by mass or more, and still more preferably 1.5 parts by mass or more. The amount is preferably 10 parts by mass or less, more preferably 5.0 parts by mass or less, and still more preferably 3.0 parts by mass or less. When the amount of vulcanization accelerator falls within the range mentioned above, the effects of the present invention can be more suitably achieved.

The rubber composition of the present invention can be prepared by conventional methods, such as for example by kneading the above components with a rubber kneading machine such as a Banbury mixer, a kneader, or an open roll mill, and vulcanizing the kneaded mixture. In the case of adding the aforementioned molten mixture in the rubber composition, the molten mixture is desirably melted and sufficiently dispersed in the rubber composition before the temperature reaches the maximum temperature in the kneading step, preferably in the stage where the power consumption of a rubber kneading machine is large, i.e., at a kneading temperature of 100° C. to 140° C. at which dispersion of filler mostly occurs. This allows the effects of the present invention to be more suitably achieved.

The pneumatic tire of the present invention can be manufactured using the above rubber composition by conventional methods. Specifically, the rubber composition, prepared by kneading the above components with a rubber kneading machine, such as an open roll mill or a Banbury mixer, as mentioned above, is before vulcanization, extruded and processed into the shape of a bead apex and/or a sidewall reinforcing layer of a tire and then assembled with other tire components on a tire building machine to build an unvulcanized tire, which is then heated and pressurized in a vulcanizer to form a tire. Thus, a tire with a bead apex and/or a sidewall reinforcing layer (vulcanized rubber compositions) containing the above components can be obtained.

The bead apex refers to a component placed between the folded portions of a carcass and extending toward the sidewall of a tire. Specifically, it is a component illustrated in, for example, FIG. 1 of JP 2009-001681 A (which is incorporated by reference in its entirety).

The sidewall reinforcing layer (insert) refers to a lining strip layer placed inside the sidewall portion of a run-flat tire. According to a specific arrangement of the reinforcing rubber layer, a crescent reinforcing rubber layer with a thickness gradually decreasing toward the ends is placed in contact with the inner side of a carcass ply from the bead portion to the shoulder portion. For example, mention may also be made of a reinforcing rubber layer placed on the carcass ply body and between the folded portions of the carcass, extending from the bead portion to the end of the tread portion, or a two-layer reinforcing rubber layer placed between carcass plies or reinforcing plies. Specifically, the reinforcing layer is a component illustrated in, for example, FIG. 1 of JP 2007-326559 A or FIG. 1 of JP 2004-330822 A (which are incorporated by reference in their entirety). Thus, the sidewall reinforcing layer containing the above components is particularly suitable for run-flat tires. Accordingly, a run-flat tire including a sidewall reinforcing layer formed from the rubber composition of the present invention is another aspect of the present invention.

The pneumatic tire is preferably manufactured by a strip winding method including: a step 1 of preparing strip-shaped rubber sheets having a thickness of 0.2 to 1.5 mm from the (unvulcanized) rubber composition using a known roll such as a calender roll; and a step 2 of laminating the rubber sheets on a tire building machine to form a bead apex and/or a sidewall reinforcing layer. This is particularly because 1,2-syndiotactic polybutadiene crystals can be oriented in the circumferential direction of a tire, so that excellent handling stability and excellent ride comfort can be obtained due to the complex elastic modulus E* anisotropy effect. Examples of such manufacture methods include those as described in JP 2009-202865 A (which is incorporated by reference in its entirety). In such a manufacture method, the hot rubber composition layers are laminated and formed, which makes it possible to sufficiently ensure building tackiness to adjacent components and tackiness between the rubber composition layers. Thus, the problems caused by poor tackiness or insufficient co-crosslinking to adjacent components can be solved, and therefore tires having good run-flat durability can be manufactured with high productivity.

Thus, in another suitable embodiment of the present invention, a bead apex and/or a sidewall reinforcing layer included in a pneumatic tire is formed from the rubber composition by strip winding.

The upper limit of the thickness of the laminated rubber sheet is more preferably 1.2 mm. The thickness of the strip is set to about 0.8-1.2 mm in view of productivity, handleability, shape stability against stretching, and bareness on uneven surfaces of tires due to poor rubber flow.

Also, the cross-sectional thickness of the sidewall reinforcing layer obtained by lamination in the step 2 is usually set to 3 to 9 mm from the viewpoints of weight saving, ride comfort, and run-flat durability.

EXAMPLES

Hereinafter, the present invention will be described in more detail by reference to examples which, however, are not intended to limit the scope of the present invention.

The physical properties of polymers produced as described later were determined by the following methods.
[Cis Content]

The cis content was measured with a JNM-ECA series NMR device available from JEOL Ltd. This measurement was made on samples prepared by dissolving each rubber sample (1 g) in toluene (15 ml) and slowly pouring each resulting solution into methanol (30 ml) for purification, followed by drying and purification.
[Weight Average Molecular Weight (Mw), Number Average Molecular Weight (Mn), Molecular Weight Distribution (Mw/Mn)]

Mw and Mn were determined by gel permeation chromatography (GPC) using the following device and conditions, with calibration using polystyrene standards, and then Mw/Mn was calculated.

Device: GPC-8000 series from Tosoh Corporation
Detector: differential refractometer
Column: TSKGEL SUPERMULTIPORE HZ-M from Tosoh Corporation
[Vinyl Content]

The vinyl content was measured by infrared absorption spectroscopy.
[Glass Transition Temperature]

The glass transition temperature was measured using a differential scanning calorimeter (Q200 available from TA Instruments Japan Inc.) at a temperature increase rate of 10° C./min in accordance with JIS-K 7121.
[Bound Styrene Content]

The bound styrene content was measured with a JNM-ECA series NMR device available from JEOL Ltd.
<Preparation of Terminal Modifier>

In nitrogen atmosphere, a 250-ml volumetric flask was charged with 3-(N,N-dimethylamino)propyltrimethoxysilane (20.8 g, AZmax.co) and then anhydrous hexane (KANTO CHEMICAL CO., INC.) to give a total amount of 250 ml. Thus, a terminal modifier was prepared.

Polymer Preparation Example 1

To a 30-L pressure-resistant vessel of which the air was sufficiently replaced by nitrogen, were added cyclohexane (18 L, KANTO CHEMICAL CO., INC.), butadiene (2,000 g, TAKACHIHO TRADING CO., LTD.), and diethyl ether (53 mmol, KANTO CHEMICAL CO., INC.). The mixture was then heated to 60° C. Next, butyllithium (16.6 mL, KANTO CHEMICAL CO., INC.) was added and the mixture was stirred for 3 hours. A 0.4 mol/L tetrachlorosilane/hexane solution (12 mL) was then added and the mixture was stirred for 30 minutes. The above terminal modifier (13 mL) was added to the resulting mixture, followed by stirring for 30 minutes. To the resulting reaction solution was added a solution of 2,6-tert-butyl-p-cresol (0.2 g, Ouchi Shinko Chemical Industrial Co., Ltd.) in methanol (2 mL, KANTO CHEMICAL CO., INC.). Then the reaction solution was put in a stainless steel vessel containing methanol (18 L), so that the resulting aggregate was collected. The collected aggregate was dried under reduced pressure for 24 hours, whereby an S-modified BR was obtained. The S-modified BR had an Mw of 550,000, a vinyl content of 13% by mass, and a cis content of 38% by mass.

Polymer Preparation Example 2

To a 30-L pressure-resistant vessel of which the air was sufficiently replaced by nitrogen, were added cyclohexane (18 L, KANTO CHEMICAL CO., INC.), butadiene (2,000 g, TAKACHIHO TRADING CO., LTD.), and diethyl ether (53 mmol, KANTO CHEMICAL CO., INC.). The mixture was then heated to 60° C. Next, butyllithium (16.6 mL, KANTO CHEMICAL CO., INC.) was added and the mixture was stirred for 3 hours. A 0.4 mol/L tetrachlorosilane/hexane solution (12 mL) was then added and the mixture was stirred for 30 minutes. The above terminal modifier (13 mL) was added to the resulting mixture, followed by stirring for 30 minutes. To the resulting reaction solution was added a solution of 2,6-tert-butyl-p-cresol (0.2 g, Ouchi Shinko Chemical Industrial Co., Ltd.) in methanol (2 mL, KANTO CHEMICAL CO., INC.). Then the reaction solution was put in a stainless steel vessel containing methanol (18 L), so that the resulting aggregate was collected. The collected aggregate was dried under reduced pressure for 24 hours, whereby a modified BR was obtained. The modified BR had an Mw of 835,000, a vinyl content of 11.9% by mass, and a cis content of 37.7% by mass.

Polymer Preparation Example 3

To a 30-L pressure-resistant vessel of which the air was sufficiently replaced by nitrogen, were added n-hexane (18 L), styrene (540 g, KANTO CHEMICAL CO., INC.), butadiene (1,460 g), and tetramethylethylenediamine (17 mmol). The mixture was then heated to 40° C. Next, a 0.4 mol/L tetrachlorosilane/hexane solution (3.5 mL) was added and the mixture was stirred for 30 minutes. To the vessel was added butyllithium (10.5 mL), and the mixture was heated to 50° C. and stirred for 3 hours. The above terminal modifier (30 mL) was added to the resulting mixture, followed by stirring for 30 minutes. To the resulting reaction solution was added a solution of 2,6-tert-butyl-p-cresol (0.2 g, Ouchi Shinko Chemical Industrial Co., Ltd.) in methanol (2 mL, KANTO CHEMICAL CO., INC.). Then the reaction solution was put in a stainless steel vessel containing methanol (18 L), so that the resulting aggregate was collected. The collected aggregate was dried under reduced pressure for 24 hours, whereby a modified SBR was obtained. The modified SBR had a bound styrene content of 25% by mass, an Mw of 400,000, and a vinyl content of 58% by mass.

Polymer Preparation Example 4

To a 30-L pressure-resistance vessel of which the air was sufficiently replaced by nitrogen, were added n-hexane (18 L), styrene (740 g, KANTO CHEMICAL CO., INC.), butadiene (1,260 g), and tetramethylethylenediamine (17 mmol). The mixture was then heated to 40° C. Next, a 0.4 mol/L tetrachlorosilane/hexane solution (3.5 mL) was added and the mixture was stirred for 30 minutes. To the vessel was added butyllithium (10.5 mL), and the mixture was heated to 50° C. and stirred for 3 hours. The above terminal modifier (30 mL) was added to the resulting mixture, followed by stirring for 30 minutes. To the resulting reaction solution was added a solution of 2,6-tert-butyl-p-cresol (0.2 g, Ouchi Shinko Chemical Industrial Co., Ltd.) in methanol (2 mL, KANTO CHEMICAL CO., INC.). Then the reaction solution was put in a stainless steel vessel containing methanol (18 L), so that the resulting aggregate was collected. The collected aggregate was dried under reduced pressure for 24 hours, whereby a modified SBR was obtained. The modified SBR had a bound styrene content of 37% by mass, an Mw of 410,000, and a vinyl content of 55% by mass.

The chemical agents used in the examples and comparative examples are listed below.

<VCR 617>: VCR 617 (SPB-containing BR, SPB content: 17% by mass, melting point of SPB: 200° C., amount of insolubles in boiling n-hexane: 15 to 18% by mass, cis content: 98% by mass) from Ube Industries, Ltd.

<Modified BR 1>: BR1250H (modified BR obtained by polymerization using a lithium initiator, followed by modification with a tin compound; vinyl content: 10% by mass, cis content: 40% by mass, Mw/Mn: 1.40, Mw: 460,000, tin atom content: 250 ppm) from Zeon Corporation <Modified BR 2>: S-modified BR prepared in Polymer preparation example 1 (vinyl content: 13% by mass, cis content: 38% by mass, Mw: 550,000, Tg: −83° C.)

<Modified BR 3>: Modified BR prepared in Polymer preparation example 2 (vinyl content: 11.9% by mass, cis content: 37.7% by mass, Mw: 835,000, Tg: −93° C.)

<Modified SBR 1>: Modified SBR prepared in Polymer preparation example 3 (vinyl content: 58% by mass, bound styrene content: 25% by mass, Mw: 400,000, Tg: −27° C.)

<Modified SBR 2>: Modified SBR prepared in Polymer preparation example 4 (vinyl content: 55% by mass, bound styrene content: 37% by mass, Mw: 410,000, Tg: −15° C.)

<IR>: IR2200 from JSR Corporation

<NR>: TSR20

<N660>: SHOBLACK N660 (carbon black, BET specific surface area: 36 $m^2$/g, COAN: 74 mL/100 g) from Cabot Japan K.K.

<S204>: S204 (carbon black, BET specific surface area: 20 $m^2$/g, COAN: 76 mL/100 g) from Evonik Degussa <N550>: SHOBLACK N550 (carbon black, BET specific surface area: 40 $m^2$/g, COAN: 82 mL/100 g) from Cabot Japan K.K.

<N351H>: SHOBLACK N351H (carbon black, BET specific surface area: 67 $m^2$/g, COAN: 102 mL/100 g) from Cabot Japan K.K.

<Silica>: Ultrasil VN3 (BET specific surface area: 175 $m^2$/g) from Evonik Degussa <6PPD>: Antigene 6C (antioxidant, N-phenyl-N'-(1,3-dimethylbutyl)-p-phenylenediamine) from Sumitomo Chemical Co., Ltd.

<TMQ>: Nocrac 224 (antioxidant, 2,2,4-trimethyl-1,2-dihydroquinoline polymer) from Ouchi Shinko Chemical Industrial Co., Ltd.

<Stearic acid>: Tsubaki from NOF Corporation

<Zinc oxide>: Ginrei R from Toho Zinc Co., Ltd.

<Si75>: Si75 (silane coupling agent, bis(3-triethoxysilylpropyl)disulfide) from Evonik Degussa <Reactive novolac phenolic resin>: SUMILITE resin PR-12686 (cashew-modified phenolic resin) from Sumitomo Bakelite Co., Ltd.

<Methylene donor HMT>: SANCELER H-T (vulcanization accelerator, hexamethylenetetramine) from SANSHIN CHEMICAL INDUSTRY CO., LTD.

<20% Oil-containing insoluble sulfur>: Mucron OT-20 (insoluble sulfur containing 60% or higher of carbon disulfide insolubles; oil content: 20% by mass) from SHIKOKU CHEMICALS CORPORATION <TBBS>: Nocceler NS-P (vulcanization accelerator, N-tert-butyl-2-benzothiazolylsulfenamide) from Ouchi Shinko Chemical Industrial Co., Ltd.

<TBSI>: Santocure TBSI (vulcanization accelerator, N-tert-butyl-2-benzothiazolylsulfeneimide) from Flexsys <Tackifying resin>: Marukarez T-100AS (C5 petroleum resin, softening point: 102° C.) from Maruzen Petrochemical Co., Ltd.

<Liquid resin>: NOVARES C10 (liquid coumarone-indene resin, softening point: 10° C.) from Ruetgers Chemicals <Product A-1>: TS3108 (alkylphenol-sulfur chloride condensate represented by the above formula (5) where $R^{21}$, $R^{22}$, $R^{23}=C_8H_{17}$, and x, y=2; sulfur content; 27% by mass, Mw=13,000, softening point: 128° C.) from Taoka Chemical Co., Ltd.

<Product A-2>: Molten mixture (Mw=13,000, softening point: 100° C.) obtained by adding 8% by mass of NOVARES C10 (liquid coumarone-indene resin, softening point: 10° C.) from Ruetgers Chemicals to product A-1, and melt-mixing the mixture <Product B-1> TACKIROL V200 (alkylphenol-sulfur chloride condensate represented by the above formula (5) where $R^{21}$, $R^{22}$, $R^{23}=C_8H_{17}$, and x, y=2; sulfur content: 24% by mass, Mw=9,000, softening point: 105° C.) from Taoka Chemical Co., Ltd.

<Product B-2>: Molten mixture (Mw=9,000, softening point: 78° C.) obtained by adding 8% by mass of NOVARES C10 (liquid coumarone-indene resin, softening point: 10° C.) from Ruetgers Chemicals to product B-1, and melt-mixing the mixture <Product C-1>: TS3109 (alkylphenol-sulfur chloride condensate represented by the above formula (5) where $R^{21}$, $R^{22}$, $R^{23}=C_8H_{17}$, and x, y=2; sulfur content: 31% by mass, Mw=56,000, softening point: 137° C.) from Taoka Chemical Co., Ltd.

<Product C-2>: Molten mixture (Mw=56,000, softening point: 102° C.) obtained by adding 16% by mass of NOVARES C10 (liquid coumarone-indene resin, softening point: 10° C.) from Ruetgers Chemicals to product C-1, and melt-mixing the mixture <Product D>: Molten mixture (Mw=13,000, softening point: 102° C.) obtained by adding 8% by mass of VivaTec 400 (TDAE oil) from H&R to product A-1, and melt-mixing the mixture <Product E>: Vultac 3 (alkylphenol-sulfur chloride condensate represented by the above formula (5) where $R^{21}$, $R^{22}$, $R^{23}=C_5H_{11}$, and x, y=2; sulfur content: 21% by mass, Mw=8,000, softening point: 110° C.) from Arkema The molten mixtures as the products A-2, B-2, C-2, and D were prepared as described below.

In accordance with each of the formulations described above, a flask containing an alkylphenol-sulfur chloride condensate was immersed in an oil bath. The alkylphenol-sulfur chloride condensate was heated to a temperature of not lower than the softening temperature and completely melted. Then a predetermined amount of a coumarone-indene resin or oil was added and the mixture was stirred with an electronic stirrer for tens of minutes. The resulting mixture was taken out, and cooled and ground with a mortar. Thus, a uniform molten mixture was obtained.

The weight average molecular weight (Mw) and the softening point of the alkylphenol-sulfur chloride condensate in each of the molten mixtures (products A-2, B-2, C-2, and D) were also measured in the following manner.

[Weight Average Molecular Weight (Mw)]

Mw was determined by gel permeation chromatography (GPC) using the following device and conditions, with calibration using polystyrene standards.

Device: GPC-8000 series from Tosoh Corporation
Detector: differential refractometer
Column: TSKGEL SUPERMULTIPORE HZ-M from Tosoh Corporation

[Softening Point]

The softening point was determined as a temperature at which a ball dropped in the measurement of the softening point specified in JIS K 6220-1:2001 with a ring and ball softening point measuring apparatus.

Examples 1 to 17, 19 to 26, and 28, Comparative Examples 1, and 3 to 9

In accordance with each of the formulations shown in Tables 1 and 2, the materials other than the sulfur, alkylphenol-sulfur chloride condensate, molten mixture, and vulcanization accelerator were kneaded with a 1.7-L Banbury mixer for 5 minutes until the discharging temperature reached 170° C. to prepare a kneaded mixture. To the kneaded mixture were added the sulfur, alkylphenol-sulfur chloride condensate or molten mixture, and vulcanization accelerator, and they were kneaded with an open two roll mill for 4 minutes until the temperature reached 105° C., thus providing an unvulcanized rubber composition.

The obtained unvulcanized rubber composition was fed into a strip winding extruder and extruded into rubber sheets (unvulcanized rubber composition) each with a width of 20 mm and a thickness of 1 mm. The rubber sheets were laminated (by strip winding [STW]) while they were hot (60° C. to 100° C.), and then press-vulcanized at 170° C. for 12 minutes, whereby a vulcanized rubber composition was obtained.

Separately, the obtained unvulcanized rubber composition was fed into a strip winding extruder and extruded into rubber sheets (unvulcanized rubber composition) each with a width of 20 mm and a thickness of 1 mm. The rubber sheets were laminated (by STW) on a tire building machine while they were hot (60° C. to 100° C.), and formed into a sidewall reinforcing layer having a predetermined shape and raw rubber thickness (maximum thickness: 7 mm), which was then assembled with other tire components to build an unvulcanized tire. The unvulcanized tire was vulcanized to prepare a test run-flat tire (tire size: 245/40ZRI8).

Examples 18 and 27, Comparative Example 2

A vulcanized rubber compositions and a sidewall reinforcing layer were prepared as shaped one-piece products from each obtained unvulcanized rubber composition, that is, by a conventional method (CONVL). Further, a test run-flat tire was prepared using this sidewall reinforcing layer and the other components prepared with conventional methods.

The following evaluations were made on the obtained unvulcanized rubber compositions, vulcanized rubber compositions, and test run-flat tires. The test results are shown in Tables 1 and 2.

(Sheet Processability)

Each of the extruded unvulcanized rubber compositions was formed into a predetermined shape of a sidewall reinforcing layer, and the formed products were evaluated visually and by touch on smooth edge conditions, flatness, uniform formation into a predetermined dimension, rubber compound scorch, cured bits, irregularities, rubber shrink, and sufficient building tackiness. The results were expressed as indices (processability indices) relative to that of Comparative Example 1 (=100). Higher indices indicate better sheet processability.

Regarding edge conditions, formed products whose edges were the smoothest with no irregularities were rated good. With regard to flatness, formed products (sheets) which were flat enough to adhere to a flat plate were rated good. With regard to rubber compound scorch, formed products which, when cut into a 15 cm square, 2 mm-thick sheet, had no irregularities due to cured bits were rated good. With regard to rubber shrink, formed products which, even after 6 hours from the sheet extrusion, had no non-uniform shrink and were joinable in building without problems were rated good. With regard to building tackiness, formed products which, when adhered to an adjacent component or jointed to the same component, exhibited no peeling or curling up were rated good.

(Run-Flat Durability)

Each of the prepared test run-flat tires with an internal air pressure of 0 kPa was run on a drum at a speed of 80 km/h. The running distance until breakage of the tire was measured, and the running distances of the test tires formed using each formulation are expressed as indices (run-flat durability indices) relative to that of Comparative Example 1 (=100) using the equation below. Higher run-flat durability indices indicate better run-flat durability.

(Run-flat durability index)=(running distance of each formulation)/(running distance of Comparative Example 1)×100

(Scorch Time)

Each unvulcanized rubber composition obtained was subjected to a vulcanization test at a measurement temperature of 130° C. using an oscillating type vulcanization tester (curelastometer) described in JIS K 6300, and a curing rate curve of time plotted against torque was then prepared. The time t10 (scorch time) (min.) at which the torque in the curing rate curve reached ML+0.1 ME was calculated, wherein ML is the minimum torque and MH is the maximum torque in the curing rate curve, and ME is the difference between these torques (MH−ML). A short scorch time may cause premature curing, resulting in rubber scorch.

(Viscoelasticity Test)

The complex elastic modulus (E*) and loss tangent (tan δ) of the vulcanized rubber compositions were measured using a viscoelasticity spectrometer VES (Iwamoto Seisakusho Co., Ltd.) at a temperature of 70° C., a frequency of 10 Hz, an initial strain of 10%, and a dynamic strain of 2%. E* values falling within a target range indicate sufficient hardness that is favorable to run-flat properties and thus are considered to lead to good handling stability. Lower tan δ indicates better low heat build-up properties (lower self-heating).

(Tensile Testing)

Using No. 3 dumbbell specimens prepared from the vulcanized rubber compositions, tensile testing was carried out at room temperature (23° C.) and at a high temperature (150° C.) in accordance with JIS K 6251 "Rubber, vulcanized or thermoplastic—Determination of tensile stress-strain properties", and elongation at break EB (%) was measured. Higher EB values indicate better elongation at break (durability).

TABLE 1

| | | Com. Ex. 1 | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| Formulation (parts by mass) | VCR 617 | 35 | 10 | 35 | 35 | 10 | 10 | 20 | 5 | 10 |
| | Modified BR 1 | — | 65 | 40 | 30 | — | — | 65 | 60 | 65 |
| | Modified BR 2 | — | — | — | — | 65 | — | — | — | — |
| | Modified BR 3 | — | — | — | — | — | 65 | — | — | — |
| | Modified SBR 1 | 40 | — | — | 10 | — | — | — | — | — |
| | Modified SBR 2 | — | — | — | — | — | — | — | — | — |
| | IR | 25 | 25 | 25 | 25 | 25 | 25 | 15 | 35 | 25 |
| | NR | — | — | — | — | — | — | — | — | — |
| | N660 | — | — | — | — | — | — | — | — | — |
| | S204 | — | — | — | — | — | — | — | — | — |
| | N550 | 46 | 46 | 46 | 46 | 46 | 46 | 46 | 46 | 35 |
| | N351H | — | — | — | — | — | — | — | — | — |
| | Silica | — | — | — | — | — | — | — | — | 18 |
| | 6PPD | 1 | 1 | 1 | 1 | 1 | 1 | 1 | 1 | 1 |
| | TMQ | 1 | 1 | 1 | 1 | 1 | 1 | 1 | 1 | 1 |
| | Stearic acid | 2 | 2 | 2 | 2 | 2 | 2 | 2 | 2 | 2 |
| | Zinc oxide | 7 | 7 | 7 | 7 | 7 | 7 | 7 | 7 | 7 |
| | Si75 | — | — | — | — | — | — | — | — | 1.08 |
| | Reactive novolac phenolic resin | — | — | — | — | — | — | — | — | — |
| | Methylene donor HMT | — | — | — | — | — | — | — | — | — |
| | 20% Oil-containing insoluble sulfur | 7 | 7 | 7 | 7 | 7 | 7 | 7 | 7 | 7 |
| | TBBS | 2 | 2 | 2 | 2 | 2 | 2 | 2 | 2 | 2 |
| | TBSI | — | — | — | — | — | — | — | — | — |
| | Tackifying resin | 2 | 2 | 2 | 2 | 2 | 2 | 2 | 2 | 2 |
| | Liquid resin | — | — | — | — | — | — | — | — | — |
| | Product A-1 | — | — | — | — | — | — | — | — | — |
| | Product A-2 | — | — | — | — | — | — | — | — | — |
| | Product B-1 | 7 | 7 | 7 | 7 | 7 | 7 | 7 | 7 | 7 |
| | Product B-2 | — | — | — | — | — | — | — | — | — |
| | Product C-1 | — | — | — | — | — | — | — | — | — |
| | Product C-2 | — | — | — | — | — | — | — | — | — |
| | Product D | — | — | — | — | — | — | — | — | — |
| | Product E | — | — | — | — | — | — | — | — | — |
| Method | | STW | STW | STW | STW | STW | STW | STW | STW | STW |
| Evaluation results | Processability index (extrusion, shrink, building) (Com. Ex. 1 = 100, target for STW ≥ 90) | 100 | 95 | 100 | 102 | 95 | 95 | 98 | 90 | 95 |

TABLE 1-continued

| | | | | | | | | | | |
|---|---|---|---|---|---|---|---|---|---|---|
| | Run-flat durability index (Com. Ex. 1 = 100, target ≥ 110) | 100 | 121 | 114 | 110 | 119 | 118 | 116 | 121 | 111 |
| | ML (1 + 4) 130° C. Scorch time (min) (target ≥ 8.0 min) | 9.8 | 10.5 | 10.6 | 11.3 | 10.4 | 10.5 | 11.2 | 9.1 | 12.1 |
| | E* at 70° C., 2% amplitude (target = 6.5 to 8.5) | 8.22 | 7.55 | 7.79 | 7.95 | 7.52 | 7.48 | 7.55 | 7.51 | 7.22 |
| | tanδ at 70° C. (target ≤ 0.039) | 0.047 | 0.025 | 0.035 | 0.038 | 0.028 | 0.027 | 0.026 | 0.027 | 0.031 |
| | EB% at 150° C. (target ≥ 50) | 80 | 92 | 85 | 82 | 91 | 90 | 85 | 94 | 92 |
| | EB% at 23° C. (target ≥ 100) | 120 | 115 | 115 | 110 | 110 | 110 | 100 | 115 | 125 |

| | | Ex. 9 | Ex. 10 | Ex. 11 | Ex. 12 | Ex. 13 | Ex. 14 | Ex. 15 | Ex. 16 | Ex. 17 |
|---|---|---|---|---|---|---|---|---|---|---|
| Formulation (parts by mass) | VCR 617 | 10 | 10 | 10 | 10 | 10 | 10 | 10 | 10 | 10 |
| | Modified BR 1 | 65 | 65 | 65 | 65 | 65 | 65 | 65 | 65 | 65 |
| | Modified BR 2 | — | — | — | — | — | — | — | — | — |
| | Modified BR 3 | — | — | — | — | — | — | — | — | — |
| | Modified SBR 1 | — | — | — | — | — | — | — | — | — |
| | Modified SBR 2 | — | — | — | — | — | — | — | — | — |
| | IR | 25 | 25 | 10 | 25 | 25 | 25 | 25 | 25 | 25 |
| | NR | — | — | — | — | — | — | — | — | — |
| | N660 | 60 | — | — | — | — | — | — | — | — |
| | S204 | — | 45 | — | — | — | — | — | — | — |
| | N550 | — | 20 | 46 | 46 | 46 | 46 | 46 | 46 | 46 |
| | N351H | — | — | — | — | — | — | — | — | — |
| | Silica | — | — | — | — | — | — | — | — | — |
| | 6PPD | 1 | 1 | 1 | 1 | 1 | 1 | 1 | 1 | 1 |
| | TMQ | 1 | 1 | 1 | 1 | 1 | 1 | 1 | 1 | 1 |
| | Stearic acid | 2 | 2 | 2 | 2 | 2 | 2 | 2 | 2 | 2 |
| | Zinc oxide | 7 | 7 | 7 | 7 | 7 | 7 | 7 | 7 | 10 |
| | Si75 | — | — | — | — | — | — | — | — | — |
| | Reactive novolac phenolic resin | — | — | — | — | — | — | — | 2 | — |
| | Methylene donor HMT | — | — | — | — | — | — | — | 0.2 | — |
| | 20% Oil-containing insoluble sulfur | 7 | 7 | 7 | 4.8 | 7 | 4.8 | 7 | 4.8 | 7 |
| | TBBS | 2 | 2 | 2 | 3 | 4 | 2 | — | 2 | 2 |
| | TBSI | — | — | — | — | — | — | 2.5 | — | — |
| | Tackifying resin | 2 | 2 | 2 | 2 | 2 | 2 | 2 | 2 | 2 |
| | Liquid resin | — | — | — | — | — | — | — | — | — |
| | Product A-1 | — | — | — | — | — | — | — | — | — |
| | Product A-2 | — | — | — | — | — | — | — | — | — |
| | Product B-1 | 7 | 7 | 7 | 7 | 1.5 | 10 | 7 | 7 | 7 |
| | Product B-2 | — | — | — | — | — | — | — | — | — |
| | Product C-1 | — | — | — | — | — | — | — | — | — |
| | Product C-2 | — | — | — | — | — | — | — | — | — |
| | Product D | — | — | — | — | — | — | — | — | — |
| | Product E | — | — | — | — | — | — | — | — | — |
| Method | | STW | STW | STW | STW | STW | STW | STW | STW | STW |
| Evaluation results | Processability index (extrusion, shrink, building) (Com. Ex. 1 = 100, target for STW ≥ 90) | 90 | 90 | 90 | 95 | 110 | 90 | 105 | 95 | 100 |
| | Run-flat durability index (Com. Ex. 1 = 100, target ≥ 110) | 110 | 117 | 121 | 115 | 110 | 115 | 130 | 110 | 124 |
| | ML (1 + 4) 130° C. Scorch time (min) (target ≥ 8.0 min) | 10.1 | 10.2 | 10.5 | 10.5 | 13.2 | 8.7 | 11.4 | 9.7 | 10.5 |
| | E* at 70° C., 2% amplitude (target = 6.5 to 8.5) | 7.74 | 7.77 | 7.62 | 7.66 | 7.45 | 7.54 | 7.58 | 7.88 | 7.59 |
| | tanδ at 70° C. (target ≤ 0.039) | 0.039 | 0.029 | 0.023 | 0.022 | 0.035 | 0.021 | 0.022 | 0.034 | 0.024 |
| | EB% at 150° C. (target ≥ 50) | 80 | 81 | 90 | 75 | 94 | 90 | 94 | 75 | 94 |
| | EB% at 23° C. (target ≥ 100) | 105 | 105 | 120 | 105 | 125 | 110 | 120 | 120 | 117 |

TABLE 2

| | | Com. Ex. 2 | Ex. 18 | Ex. 19 | Ex. 20 | Ex. 21 | Ex. 22 | Ex. 23 | Ex. 24 | Ex. 25 | Com. Ex. 3 |
|---|---|---|---|---|---|---|---|---|---|---|---|
| Formulation (parts by mass) | VCR 617 | 35 | 10 | 10 | 10 | 10 | 10 | 10 | 10 | 10 | 3 |
| | Modifed BR 1 | — | 65 | 65 | 65 | 65 | 65 | 65 | 65 | 65 | 62 |
| | Modifed BR 2 | — | — | — | — | — | — | — | — | — | — |
| | Modified BR 3 | — | — | — | — | — | — | — | — | — | — |
| | Modified SBR 1 | 40 | — | — | — | — | — | — | — | — | — |
| | Modified SBR 2 | — | — | — | — | — | — | — | — | — | — |
| | IR | 25 | 25 | 25 | 25 | 25 | 25 | 25 | 25 | 25 | 35 |
| | NR | — | — | — | — | — | — | — | — | — | — |
| | N660 | — | — | — | — | — | — | — | — | — | — |

TABLE 2-continued

|  | | | | | | | | | | |
|---|---|---|---|---|---|---|---|---|---|---|
| | S204 | — | — | — | — | — | — | — | — | — | — |
| | N550 | 46 | 46 | 46 | 46 | 46 | 46 | 46 | 46 | 46 | 46 |
| | N351H | — | — | — | — | — | — | — | — | — | — |
| | Silica | — | — | — | — | — | — | — | — | — | — |
| | 6PPD | 1 | 1 | 1 | 1 | 1 | 1 | 1 | 1 | 1 | 1 |
| | TMQ | 1 | 1 | 1 | 1 | 1 | 1 | 1 | 1 | 1 | 1 |
| | Stearic acid | 2 | 2 | 2 | 2 | 2 | 2 | 2 | 2 | 2 | 2 |
| | Zinc oxide | 7 | 8 | 8 | 8 | 8 | 8 | 8 | 8 | 8 | 7 |
| | Si75 | — | — | — | — | — | — | — | — | — | — |
| | Reactive novolac phenolic resin | — | — | — | — | — | — | — | — | — | — |
| | Methylene donor HMT | — | — | — | — | — | — | — | — | — | — |
| | 20% Oil-containing insoluble sulfur | 7 | 7 | 7 | 7 | 7 | 7 | 7 | 7 | 7 | 7 |
| | TBBS | 2 | 2 | 2 | 2 | 2 | 2 | 2 | 2 | 2 | 2 |
| | TBSI | — | — | — | — | — | — | — | — | — | — |
| | Tackifyinq resin | 2 | 2 | 2 | 2 | 2 | 2 | 2 | 2 | 2 | 2 |
| | Liquid resin | — | — | — | — | — | — | — | — | — | — |
| | Product A-1 | — | — | 7 | — | — | — | — | — | — | — |
| | Product A-2 | — | — | — | 7 | — | — | — | — | — | — |
| | Product B-1 | 7 | 7 | — | — | — | — | — | — | — | 7 |
| | Product B-2 | — | — | — | — | 7 | — | — | — | — | — |
| | Product C-1 | — | — | — | — | — | 7 | — | — | — | — |
| | Product C-2 | — | — | — | — | — | — | 7 | — | — | — |
| | Product D | — | — | — | — | — | — | — | 7 | — | — |
| | Product E | — | — | — | — | — | — | — | — | 7 | — |
| Method | | CONVL | CONVL | STW | STW | STW | STW | STW | STW | STW | STW |
| Evaluation results | Processability index (extrusion, shrink, building) (Com. Ex. 1 = 100, target for STW ≥ 90) | 90 | 80 | 90 | 110 | 105 | 95 | 105 | 100 | 90 | 70 |
| | Run-flat durability index (Com. Ex. 1 = 100, target ≥ 110) | 95 | 117 | 115 | 130 | 125 | 121 | 125 | 115 | 110 | 115 |
| | ML(1 + 4) 130° C. Scorch time (min) (target ≥ 8.0 min) | 9.8 | 10.5 | 8.2 | 11.6 | 11.4 | 10.9 | 12.2 | 11.4 | 9.2 | 10.5 |
| | E* at 70° C., 2% amplitude (target = 6.5 to 8.5) | 8.22 | 7.55 | 7.52 | 7.52 | 7.48 | 7.57 | 7.45 | 7.66 | 7.33 | 7.12 |
| | tanδ at 70° C. (target ≤ 0.039) | 0.047 | 0.025 | 0.028 | 0.021 | 0.023 | 0.024 | 0.022 | 0.025 | 0.029 | 0.029 |
| | EB % at 150° C. (target ≥ 50) | 80 | 92 | 84 | 100 | 96 | 94 | 96 | 83 | 78 | 90 |
| | EB % at 23° C. (target ≥ 100) | 120 | 115 | 105 | 125 | 119 | 117 | 119 | 110 | 105 | 120 |

| | | Com. Ex. 4 | Com. Ex. 5 | Com. Ex. 6 | Com. Ex. 7 | Com. Ex. 8 | Com. Ex. 9 | Ex. 26 | Ex. 27 | Ex. 28 |
|---|---|---|---|---|---|---|---|---|---|---|
| Formulation (parts by mass) | VCR 617 | 45 | 35 | 10 | 10 | 10 | 10 | 10 | 10 | 10 |
| | Modifed BR 1 | 30 | 8 | 80 | 65 | 65 | 65 | 75 | 65 | 65 |
| | Modifed BR 2 | — | — | — | — | — | — | — | — | — |
| | Modifed BR 3 | — | — | — | — | — | — | — | — | — |
| | Modified SBR 1 | — | 32 | — | — | — | — | — | — | — |
| | Modified SBR 2 | — | — | — | — | — | — | — | — | — |
| | IR | 25 | 25 | 10 | 25 | 25 | 25 | 15 | 25 | 25 |
| | NR | — | — | — | — | — | — | — | — | — |
| | N660 | — | — | — | — | 30 | — | — | — | — |
| | S204 | — | — | — | — | — | 40 | — | — | — |
| | N550 | 46 | 46 | 46 | 26 | — | — | 46 | 46 | 46 |
| | N351H | — | — | — | — | — | 35 | — | — | — |
| | Silica | — | — | — | 40 | — | — | — | — | — |
| | 6PPD | 1 | 1 | 1 | 1 | 1 | 1 | 1 | 1 | 1 |
| | TMQ | 1 | 1 | 1 | 1 | 1 | 1 | 1 | 1 | 1 |
| | Stearic acid | 2 | 2 | 2 | 2 | 2 | 2 | 2 | 2 | 2 |
| | Zinc oxide | 7 | 7 | 7 | 7 | 7 | 7 | 7 | 7 | 7 |
| | Si75 | — | — | — | 2.4 | 1.2 | 1.2 | — | — | — |
| | Reactive novolac phenolic resin | — | — | — | — | — | — | — | — | — |
| | Methylene donor HMT | — | — | — | — | — | — | — | — | — |
| | 20% Oil-containing insoluble sulfur | 7 | 7 | 7 | 7 | 7 | 7 | 7 | 7 | 7 |
| | TBBS | 2 | 2 | 2 | 2 | 2 | 2 | 2 | — | — |
| | TBSI | — | — | — | — | — | — | — | 2.5 | 2.5 |
| | Tackifyinq resin | 2 | 2 | 2 | 2 | 2 | 2 | 2 | 2 | 1 |

TABLE 2-continued

| | | | | | | | | | | |
|---|---|---|---|---|---|---|---|---|---|---|
| | Liquid resin | — | — | — | — | — | — | — | — | 2 |
| | Product A-1 | — | — | — | — | — | — | — | — | — |
| | Product A-2 | — | — | — | — | — | — | — | — | — |
| | Product B-1 | 7 | 7 | 7 | 7 | 7 | 7 | 7 | 7 | 7 |
| | Product B-2 | — | — | — | — | — | — | — | — | — |
| | Product C-1 | — | — | — | — | — | — | — | — | — |
| | Product C-2 | — | — | — | — | — | — | — | — | — |
| | Product D | — | — | — | — | — | — | — | — | — |
| | Product E | — | — | — | — | — | — | — | — | — |
| Method | | STW | STW | STW | STW | STW | STW | STW | CONVL | STW |
| Evaluation results | Processability index (extrusion, shrink, building) (Com. Ex. 1 = 100, target for STW ≥ 90) | 120 | 115 | 80 | 75 | 70 | 90 | 90 | 95 | 110 |
| | Run-flat durability index (Com. Ex. 1 = 100, target ≥ 110) | 92 | 95 | 109 | 105 | 80 | 80 | 112 | 126 | 140 |
| | ML(1 + 4) 130° C. Scorch time (min) (target ≥ 8.0 min) | 10.6 | 12.1 | 10.8 | 13.9 | 8.9 | 11.2 | 11.3 | 11.4 | 11.4 |
| | E* at 70° C., 2% amplitude (target = 6.5 to 8.5) | 7.79 | 7.88 | 6.98 | 7.61 | 8.21 | 7.4 | 7.21 | 7.58 | 7.59 |
| | tanδ at 70° C. (target ≤ 0.039) | 0.049 | 0.047 | 0.021 | 0.044 | 0.044 | 0.029 | 0.022 | 0.022 | 0.019 |
| | EB % at 150° C. (target ≥ 50) | 79 | 83 | 55 | 94 | 55 | 48 | 75 | 94 | 103 |
| | EB % at 23° C. (target ≥ 100) | 115 | 110 | 90 | 120 | 90 | 116 | 110 | 120 | 135 |

The abbreviations for methods in Table 1 and Table 2 are shown below.
STW: Strip winding
CONVL: Conventional method The results of Tables 1 and 2 show the following.

It is demonstrated that in the examples using a rubber composition of the present invention that contained a rubber component with a specific compositional formulation and a specific amount of a specific carbon black, balanced improvements in high-hardness properties, elongation at break, and self-heating properties were achieved to provide good run-flat durability while good processability was maintained; in addition, good scorch resistance in favor of processability was exhibited.

Moreover, Example 1 and Example 18 use the same formulation but employ different methods. Comparison of these examples reveals that processability is better when STW (strip winding) is employed. This is probably because the STW method includes attaching a hot strip-shaped rubber sheet to an unvulcanized tire cover, which increases tackiness so that the problem of a non-uniform shrink cannot easily occur.

The invention claimed is:

1. A pneumatic tire, comprising at least one of a bead apex and a sidewall reinforcing layer each formed from a rubber composition,
the rubber composition comprising a rubber component (A) and a carbon black (B),
the rubber component (A) containing, based on 100% by mass of the rubber component (A): 10 to 75% by mass of a modified butadiene rubber (A1) with a cis content of 50% by mass or less; 5 to 40% by mass of a polybutadiene rubber (A2) containing 1,2-syndiotactic polybutadiene crystals;
and 10 to 40% by mass of a diene rubber (A3) different from the rubbers (A1) and (A2),
the rubber composition comprising 35 to 65 parts by mass of the carbon black (B) for each 100 parts by mass of the rubber component (A),
the carbon black (B) having a BET specific surface area of 18 to 50 $m^2/g$.

2. The pneumatic tire according to claim 1,
wherein the modified butadiene rubber (A1) is at least one selected from the group consisting of a modified butadiene rubber (A1a) modified with a tin compound containing a tin atom-containing group, a modified butadiene rubber (A1b) modified with a compound containing an alkoxysilyl group, and a modified butadiene rubber (A1c) modified with a low molecular weight compound containing a glycidyl amino group within a molecule.

3. The pneumatic tire according to claim 1,
wherein the diene rubber (A3) is an isoprene-based rubber.

4. The pneumatic tire according to claim 1,
wherein an amount of reactive novolac phenolic resin in the rubber composition is 1 part by mass or less for each 100 parts by mass of the rubber component.

5. The pneumatic tire according to claim 1,
wherein the rubber composition comprises, for each 100 parts by mass of the rubber component, 1.0 to 10 parts by mass of an alkylphenol-sulfur chloride condensate and 3.5 to 7.0 parts by mass of insoluble sulfur.

6. The pneumatic tire according to claim 1,
wherein the rubber composition comprises a molten mixture of an alkylphenol-sulfur chloride condensate and a coumarone-indene resin.

7. The pneumatic tire according to claim 1,
wherein the at least one of a bead apex and a sidewall reinforcing layer is formed from the rubber composition by strip winding.

* * * * *